Feb. 23, 1932.  E. PEACOCK  1,846,451
GRAIN SAVER FOR BAGGING PLATFORMS
Filed May 8, 1930
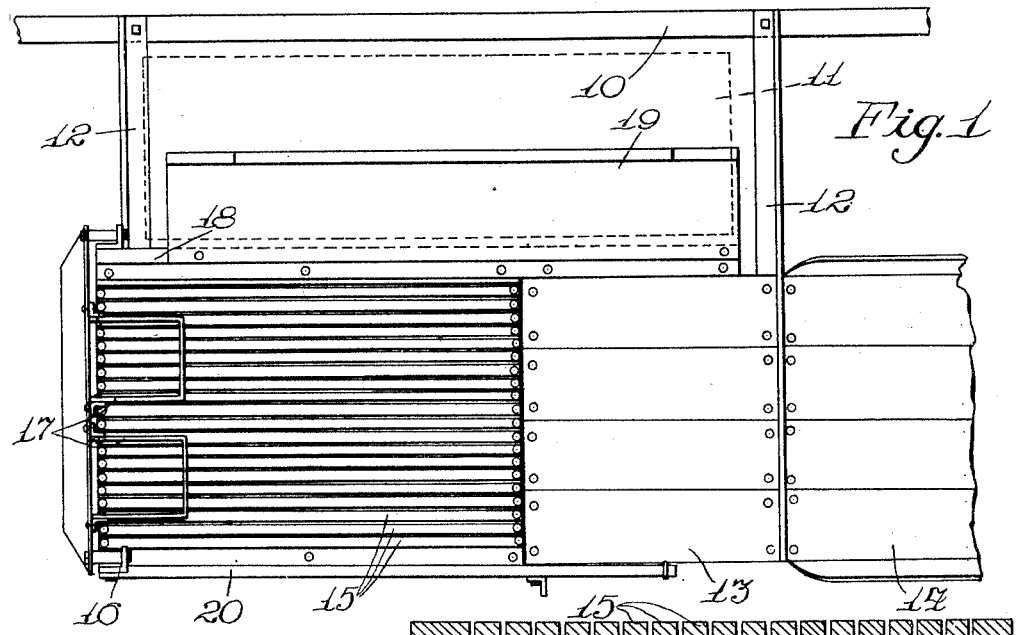
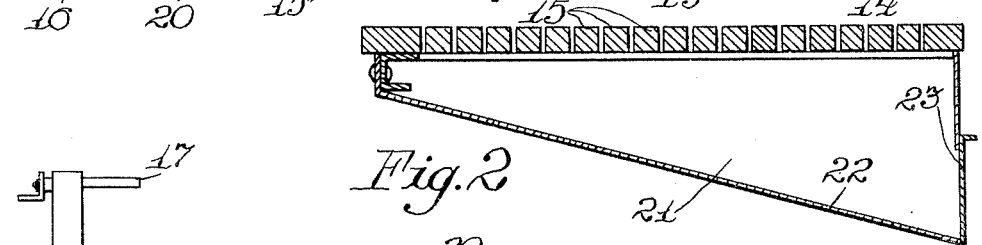
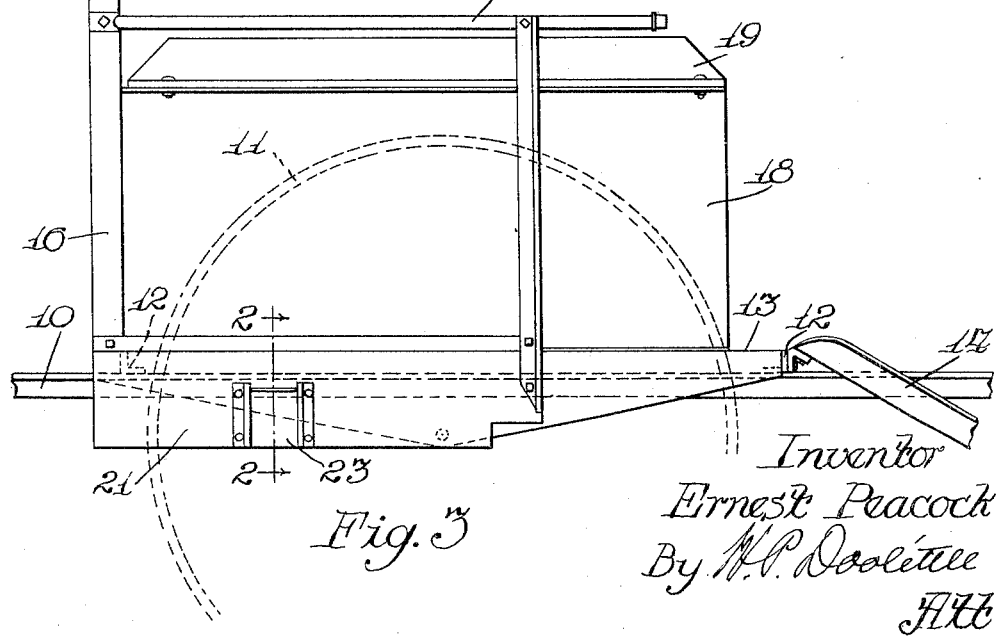
Inventor
Ernest Peacock
By W.P. Doolittle
Atty.

Patented Feb. 23, 1932

1,846,451

UNITED STATES PATENT OFFICE

ERNEST PEACOCK, OF BAHIA BLANCA, ARGENTINA, ASSIGNOR TO INTERNATIONAL HARVESTER COMPANY, A CORPORATION OF NEW JERSEY

GRAIN SAVER FOR BAGGING PLATFORMS

Application filed May 8, 1930. Serial No. 450,652.

This invention relates to reaper threshers and particularly to the provision of a grain saving means for the bagging platform and bag chute used as an attachment on reaper threshers.

This bagging platform and chute structure is usually hung from the stubbleward side of the reaper thresher and involves holders for carrying bags into which the grain coming from the reaper thresher is discharged. An operator is stationed on this bagging platform and it is his duty to handle the bags and sew them shut when they are filled and then slide them down the chute to deposit the filled and sewed bags on to the field, from which they are later gathered. In handling these bags a considerable quantity of grain is usually spilled onto the platform where it is trampled by the feet of the operator. This spilled grain thus represents waste, which cannot conveniently be retrieved.

Accordingly, it is the primary object of this invention to provide a hopper underneath the bagging platform and to construct the platform with a grated floor above the hopper so that any grain that should be spilled will fall through the grating and accumulate in the hopper, thereby saving the same.

Another object is to provide a hopper of this kind which has a sloping bottom so that the grain saved can conveniently be discharged by gravity through an opening closed by a removable door.

Other objects will be apparent to those skilled in this art as the disclosure is more fully made.

Briefly these objects may be achieved by the preferred embodiment of the invention shown in the accompanying sheet of drawings, in which:

Figure 1 is a general plan view of a bagging platform and bag chute attached to the stubbleward side of the reaper thresher;

Figure 2 is a transverse cross sectional view through the grated platform floor and the hopper, as seen along the line 2—2 appearing in Figure 3 when looking in the direction of the arrows; and, Figure 3 is a general side elevational view of the structure shown in Figure 1.

As the reaper thresher may be of any standard construction, only the stubbleward side thereof, represented by the longitudinal frame member 10, is illustrated. This frame is conventionally carried on the main or stubbleward wheel of the reaper thresher 11, generally indicated in dotted lines. Extending transversely of and carried by the frame 10 are front and rear frame members 12, which carry the bagging platform 13 alongside the reaper thresher and adjacent the wheel 11, so that the weight of said attachment will best be carried by said wheel. Extending from the end of the bagging platform 13 is the usual bag chute 14 down which the filled and sewed bags are slid in the usual way to discharge the same upon the ground. The front end of the platform is made up of a series of spaced wood strips 15 comprising the grating upon which the operator is stationed.

At the front end of the platform 13 is an upstanding frame structure 16, which carries at its top a pair of bag holders 17 for supporting bags to be filled with grain coming from suitable discharge spouts from the reaper thresher, not shown. Alongside the reaper thresher the platform 13 carries a wall 18 on the top of which is formed a seat 19 for the convenience of the operator. At the opposite side of the platform the same is formed with a guard railing 20 to permit the operator to work and move around, in such a manner that he cannot accidentally fall from his station.

Underneath the grating 15 is formed a spacious hopper 21 having a laterally sloped bottom 22, so that grain caught by this hopper 21 may be discharged by gravity through a discharge opening at the stubbleward end of the hopper which is closed by a removable slide door 23.

In use it will be seen that, as the bags are handled by the operator, if any grain is accidentally spilled, the same will fall into the spaces between the grating 15 and pass into the hopper 22 where it accumulates and is saved. At intervals, as occasion requires, a bag or other receiving means can be located beneath the discharge opening of the hopper and upon sliding the door 23 upwardly the saved grain is caused to be discharged and retrieved in an obvious manner.

From this disclosure, it will be appreciated that this invention provides structure which achieves all of the desirable objects heretofore set forth and that the same is simple and not costly, and capable of use without materially modifying the standard bagging platforms and chutes now in use on reaper threshers.

It is the intention to cover all such immaterial changes of the example herein disclosed which do not depart from the spirit and scope of the invention as indicated by the following claims.

What is claimed is:

1. The combination with a reaper thresher having a longitudinal frame, of a bagging platform and bag chute attachment arranged laterally of and at the side of said frame, a hopper located underneath said platform, and spaced grate bars comprising a floor for the platform above said hopper upon which the operator stations himself.

2. The combination with a reaper thresher having a longitudinal frame, of a bagging platform and bag chute attachment arranged laterally of and at the side of said frame, a hopper located underneath said platform, a grated floor for the platform above the hopper, said hopper having a downwardly and outwardly sloped bottom, the hopper also having a discharge opening at its outward side, and a door closing the same.

3. The combination with a reaper thresher having a main wheel and a frame carried thereby, of a bagging platform and bag chute attachment arranged laterally of and at the side of said frame and wheel, said platform comprising a floor upon which the operator stands, the floor having a solid portion at one end adjacent the chute part and an open grate bar floor adjacent the bagging end of the platform, a hopper located underneath said grate bar floor portion, a straight bottom for the hopper sloping outwardly and downwardly to the outer wall of the hopper, said outer wall formed with an opening, and a door closing said opening, whereby the contents of the hopper may be discharged by gravity.

In testimony whereof I affix my signature.

ERNEST PEACOCK.